Oct. 23, 1928.                           1,688,819
J. LECK
CENTERING TOOL
Filed April 4, 1927
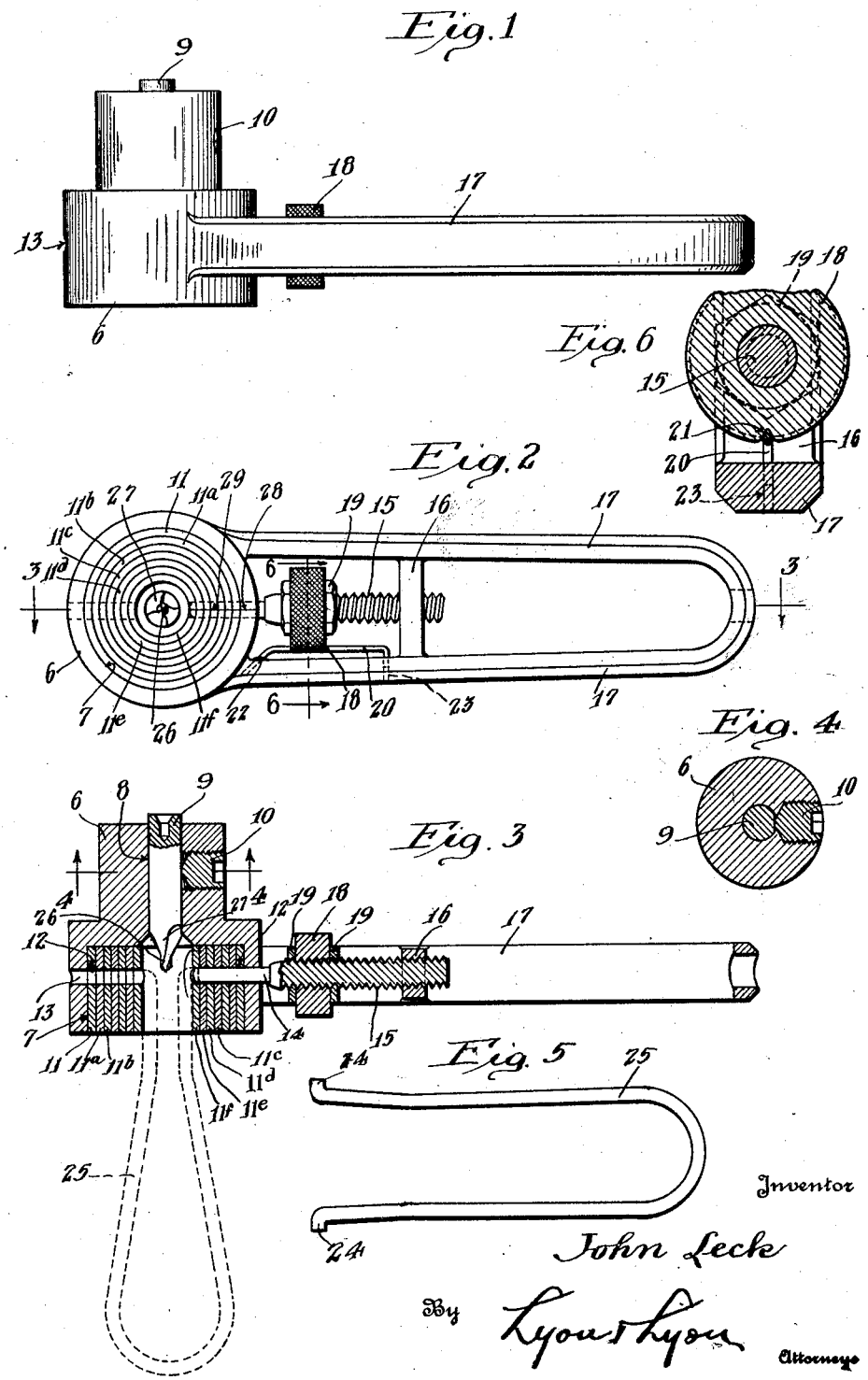

Patented Oct. 23, 1928.

1,688,819

UNITED STATES PATENT OFFICE.

JOHN LECK, OF ESCONDIDO, CALIFORNIA, ASSIGNOR OF ONE-HALF TO WILLIAM A. DYER, OF ESCONDIDO, CALIFORNIA.

CENTERING TOOL.

Application filed April 4, 1927. Serial No. 180,775.

This invention relates to tools of the character employed in making centers in the ends of bars or other pieces of material that are to be turned or machined in the lathe.

An object of the invention is to speedily effect accurate centering.

Another object is to provide for ready adjustment of the tool to different diameters of stock that is to be centered.

Another object is simplicity of construction.

Further objects and advantages will appear hereinafter.

The accompanying drawings illustrate the invention:

Figure 1 is a side elevation of a centering tool constructed in accordance with the provisions of this invention.

Figure 2 is a plan view of Figure 1.

Figure 3 is a longitudinal section on the line indicated by 3—3, Figure 2. An instrument for removing the bushing being indicated in broken lines.

Figure 4 is a cross section on the line indicated by 4—4, Figure 3.

Figure 5 is a longitudinal view of the instrument for removing the bushings.

Figure 6 is a large fragmental section on the line indicated by 6—6, Figure 2.

There is provided a body 6 having a cylindrical recess 7 in one end thereof and having a drill seat 8 which extends from the recess 7 to the opposite end of said body. In the drill seat is a drill 9 which is removably secured in place by a set screw 10 which is screwed into the body 6 so that the inner end of the said screw bears against the side of the drill 9.

In use, if the bar or other piece to be centered is of but slightly less diameter than the recess 7, said piece will be clamped in the head stock of the lathe in a manner well understood in the art relating to lathe work, and the body 6 will then be placed over the free end of the piece. The head stock will then be rotated and the tail stock will be fed toward the head stock to cause the drill 9 to drill a center in the end of the piece held in the head stock. It will be readily understood that said piece may be of circular or rectangular cross section and that it is only necessary that the piece be of a diameter to approximately fit in the recess 7. Also, it does not matter if the end of the piece that engages the recess 7 is at right angles to the sides of said piece, since the inner faces of the opposite sides of the wall of the recess 7 are circular.

It may be that it will be desirable to make the body 6 of a comparatively soft metal such, for example, as cast iron or brass and, in that event, one or more bushings may be placed within the recess 7, said bushings being made of a harder metal, such as tool steel. It is to be understood that one or more bushings may be employed.

In the particular instance shown in the drawings, seven bushings are shown nesting one within another and designated by the characters 11, $11^a$, $11^b$, $11^c$, $11^d$, $11^e$, and $11^f$ respectively. The bushings are a sliding fit within one another and have side walls that are straight so that the inner faces of opposite portions of the wall of each bushing are parallel to each other and to the inner face of the wall of the recess 7.

The bushing may be of any suitable thickness. By employing one or more bushings, the tool can be readily adjusted to fit bars or other stock of different diameters. Thus, a bar of a given diameter will fit in the recess 7 and a bar of slightly less diameter will fit in the bore of the bushing 11. In Figures 2 and 3, all of the bushings are shown in place and, thus, the stock to which the tool is adjusted is of the least diameter that the tool can operate on. When it is desired to operate upon stock of larger diameter, the requisite number of bushings will be removed until the innermost bushing remaining has a bore of the diameter suited for the stock that is to be centered.

A suitable means is provided for retaining the bushings in the body 6 and this means, in this instance, is constructed as follows: Each bushing is provided with a circular orifice 12 and all of the orifices are in alinement and are alined with a circular orifice 13 in the body 6. Adapted to extend through the orifice 3 into one or more of the orifices 12 is a pin 14 which has a screw threaded shank 15. The shank 15 has threaded engagement with a member 16 which, in this instance, constitutes a cross bar in a handle, that comprises spaced longitudinally extending members 17 to which the ends of the member 16 are connected. By turning the pin 14, said pin may be caused to engage and disengage the bushings.

There is quite an advantage in having the pitch of the screw threads of the shank 15 equal to the thickness of the bushings. If, for example, the bushings are one-sixteenth of an inch in thickness, the pitch of the screw threads will preferably be one-sixteenth of an inch, so that one turn of the shank 15 will move the pin 14 in or out the thickness of one bushing, thus enabling the operator to very easily determine when any particular bushing is engaged or disengaged by the pin 14. Turning of the shank 15 is facilitated by providing a knurled operating member 18 in the form of a nut which is threaded onto the shank 15, lock nuts 19 on opposite sides of said nut 18 holding the nut 18 against turning relative to the shank.

In order that the operator may readily know when the shank 15 has been turned one or more revolutions, a resilient latch or stop 20 is provided to engage a notch 21 in the periphery of the member 18. The latch member 20 may be of spring material and soldered or otherwise secured at one end at 22 to one of the members 17. A portion of the latch member extends lengthwise of the member 17, to which it is attached, and along the inner face of said member and slidably spaced therefrom, and the unattached end of said latch member is bent at an angle to the straight portion and is accommodated in an orifice 23 in the member 17 to which the latch member is secured, thus permitting bending of the latch member away from the member 18 a sufficient distance to withdraw said latch member from the notch 21. However, the side faces of the notch 21 are sloped or beveled sufficiently so that when the member 18 is forcibly turned, the latch member 20 is forced out of the notch. Every time the member 18 is turned into position to register the notch 21 with the latch member, said latch member will click into said notch, thus notifying the operator of the completion of one revolution of the shank 15.

Since, in order to secure accuracy in centering, the bushings must fit closely within one another, it is expedient to provide an instrument or device for engaging and withdrawing the bushings, one at a time. It has been heretofore stated that the bushings are provided with orifices 12 to accommodate the pin 14 and these orifices are provided in duplicate in the bushings, and are indicated by the same reference character. The pin 14 engages one set of the orifices 12 and the other set of said orifices is positioned in alinement with the first mentioned set. The orifices in the innermost bushing are engaged from the bore of the bushing by the outwardly bent ends 24 of a resilient U-shaped bushing-engaging member 25. When the operator desires to remove one of the bushings, he compresses the member 25 within his hand so that the end portions of the member 25 will approach each other sufficiently close to permit of them being inserted within the bore of the bushing that is to be removed. The operator causes the bent ends 24 to be alined with the orifices 12 and permits the member 25 to expand, thus firmly gripping the inner bushing. The pin 14 will be retracted from said inner bushing and the operator will then pull on the member 25 to pull said inner bushing out of the bushing in which it nests, or, if said bushing be the outermost one, it will be pulled out of the recess 7.

The handle members 17 are attached to the body 6 in any suitable manner and, if desired, may be integral with said body.

Preferably the drill 9 has a straight drilling tip portion 26 and a tapered drilling portion 27 for counter-boring the center during the drilling of said center.

To operate the tool above described, as many bushings will be removed from the body as is necessary to permit of the tool being placed over the end of the work to be centered. To remove a bushing or bushings, the operator will turn the member 18 as many times as there are bushings to be removed, thus retracting the pin 14 from said bushings. This unlatches the bushings from the body 6 since the pin 14 constitutes a latch for engaging the bushings. Then the operator employs the instrument 25 in the manner hereinbefore described to remove the unlatched bushings.

Having thus adjusted the tool so as to properly fit over the work to be centered, the operator, having placed the work in the head stock of the lathe, will place the tool so that the free end of the work will engage in the bore of the bushing and he will then feed the tail stock of the lathe toward the head stock, at the same time causing the lathe to operate so as to rotate the work in contact with the drill 9, thereby drilling a center in the end of the work.

To facilitate alining the orifices 12, when inserting the bushings in place, I, preferably, provide an alining indication 28 on the body 6 and an alining indication 29 on each of the bushings. In this instance, the indications 28, 29 are lines formed by cutting into the outer ends of the bushings and adjacent end of the body 6. When the indications 28, 29 are in alinement, the orifices 12, 13 are accurately alined so that the pin 14 can be moved into the orifices 12.

I claim:

1. A centering tool comprising a body provided with a recess in one end and with a drill seat axially alined with the recess, a drill in the drill seat projecting into the recess, a bushing removably fitting in the recess, the inner faces of opposite walls of the bushing parallel, the body and bushing provided with alined orifices, a pin projecting into the orifice in the body, a means to move the pin into and out of the orifice in the bushing, and a means to indicate a length of movement of the pin.

2. A centering tool comprising a body provided with a recess in one end and with a drill seat axially alined with the recess, a drill in the drill seat projecting into the recess, a bushing removably fitting in the recess, the inner faces of opposite walls of the bushing parallel, a movable means releasably connecting the body and bushing, and a means to indicate a distance moved by the last mentioned means.

3. A centering tool comprising a body provided with axially alined recess and drill seat, the recess being of considerably larger diameter than the drill seat and the end wall of the recess constituting a flat shoulder, a plurality of bushings in the recess fitting one within another with their inner ends seated against the shoulder, a means releasably holding the bushings in the recess, and a drill secured in the drill seat and projecting into the recess.

4. A centering tool comprising a body provided with axially alined recess and drill seat, a drill secured in the drill seat and projecting into the recess, spaced handle members secured at one end to the body, a bushing in the recess, the body and bushing provided with alined orifices, a pin projecting into the orifices and extending between the handle members, a cross bar extending between the handle members, the pin having screw threaded engagement with the cross bar, and a means to turn the pin.

5. A centering tool comprising a body provided with axially alined recess and drill seat, a drill secured in the drill seat and projecting into the recess, spaced handle members secured at one end to the body, a bushing in the recess, the body and bushing provided with alined orifices, a pin projecting into the orifices and extending between the handle members, the pin having screw threaded engagement with the cross bar, an operating member secured on the pin, and a spring latch on one of the handle members yieldingly engaging the operating member.

6. A centering tool comprising a body provided with axially alined recess and drill seat, a drill secured in the drill seat and projecting into the recess, spaced handle members secured at one end to the body, a plurality of bushings in the recess fitting one within another, the body and bushings provided with alined orifices, a pin projecting into the orifices and extending between the handle members, a cross bar extending between the handle members, the pin having screw threaded engagement with the cross bar, the pitch of the screw threads being equal to the thickness of each bushing, an operating member secured on the pin and provided in its periphery with a notch, and a spring latch on one of the handle members engageable with the notch when the operating member is turned to register the latch and notch.

Signed at Los Angeles, Calif., this 28 day of March, 1927.

JOHN LECK.